US006301601B1

United States Patent
Helland et al.

(10) Patent No.: US 6,301,601 B1
(45) Date of Patent: *Oct. 9, 2001

(54) DISABLING AND ENABLING TRANSACTION COMMITTAL IN TRANSACTIONAL APPLICATION COMPONENTS

(75) Inventors: Patrick James Helland, Redmond; Rodney Limprecht, Woodinville; Mohsen Al-Ghosein, Issaquah, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/351,374

(22) Filed: Jul. 12, 1999

Related U.S. Application Data

(63) Continuation of application No. 08/959,142, filed on Oct. 28, 1997, now Pat. No. 5,958,004.

(51) Int. Cl.[7] ....................................... G06F 13/00
(52) U.S. Cl. .......................... 709/101; 709/203; 709/223; 709/329; 707/104
(58) Field of Search ................... 709/100, 101, 709/102, 106, 202, 203, 219, 223, 224, 225, 313, 318, 328, 329; 707/103, 104

(56) References Cited

U.S. PATENT DOCUMENTS

| | | |
|---|---|---|
| 4,752,928 | 6/1988 | Chapman et al. . |
| 4,972,437 | 11/1990 | Citron et al. . |
| 5,125,091 | 6/1992 | Staas, Jr. et al. . |
| 5,151,987 | 9/1992 | Abraham et al. . |
| 5,212,793 | 5/1993 | Donica et al. . |

(List continued on next page.)

FOREIGN PATENT DOCUMENTS

| | | |
|---|---|---|
| 0 414 624 A | 2/1991 | (EP) . |
| 0 674 260 A | 9/1995 | (EP) . |
| 0 738 966 A | 10/1996 | (EP) . |
| 0 777 178 A | 6/1997 | (EP) . |
| WO 98 02809 A | 1/1998 | (WO) . |

OTHER PUBLICATIONS

Gray & Reuter, □The Role of a Compensating Transaction,□ Transaction Processing: Concepts and Techniques, pp. 204–205 (1993).

Tucker, Jr. (Editor), □Concurrency Control and Recovery,□ The Computer Science and Engineering Handbook, pp. 1058–1077 (Dec. 1996).

Bernstein and Newcomer, "Database System Recovery," Principles of Transaction Processing for the Systems Professional, Morgan Kaufmann Publishers, Inc., San Francisco, CA, chapter 8, pp. 241–266 (Jan. 1997).

(List continued on next page.)

*Primary Examiner*—Viet D. Vu
(74) *Attorney, Agent, or Firm*—Klarquist Sparkman Campbell Leigh & Whinston, LLP

(57) ABSTRACT

A run-time environment implemented as system services and component integration interfaces provides a capability for components of a component-based server application to reversibly disable committal of a transaction in which the component participates. On return from a call to the component which leaves the component's transactional work in an invalid state, the component can disable commit of the transaction so as to avoid premature committal of the component's transactional work. On return from a call to the component which renders the component's transactional work in a valid state, the component re-enables commit of the transaction. If committal of the transaction is initiated when any component in the transaction disables commit, the transaction is aborted.

41 Claims, 7 Drawing Sheets

U.S. PATENT DOCUMENTS

| | | |
|---|---|---|
| 5,301,280 | 4/1994 | Schwartz et al. . |
| 5,455,953 | 10/1995 | Russell . |
| 5,481,715 | 1/1996 | Hamilton et al. . |
| 5,524,238 | 6/1996 | Miller et al. . |
| 5,561,797 | 10/1996 | Gilles et al. . |
| 5,577,252 | 11/1996 | Nelson et al. . |
| 5,581,686 | 12/1996 | Koppolu et al. . |
| 5,581,760 | 12/1996 | Atkinson et al. . |
| 5,606,719 | 2/1997 | Nichols et al. . |
| 5,619,710 | 4/1997 | Travis, Jr. et al. . |
| 5,625,775 | 4/1997 | Davis et al. . |
| 5,687,370 | 11/1997 | Garst et al. . |
| 5,689,708 | 11/1997 | Regnier et al. . |
| 5,706,429 | 1/1998 | Lai et al. . |
| 5,717,439 | 2/1998 | Levine et al. . |
| 5,764,897 | 6/1998 | Khalidi . |
| 5,765,174 | 6/1998 | Bishop et al. . |
| 5,778,365 | 7/1998 | Nishiyama . |
| 5,781,910 | 7/1998 | Gostanian et al. . |
| 5,790,789 | 8/1998 | Suarez . |
| 5,794,038 | 8/1998 | Stutz et al. . |
| 5,802,291 | 9/1998 | Balick et al. . |
| 5,815,665 | 9/1998 | Teper et al. . |
| 5,822,435 | 10/1998 | Boebert et al. . |
| 5,822,585 | 10/1998 | Noble et al. . |
| 5,832,274 | 11/1998 | Cutler et al. . |
| 5,838,916 | 11/1998 | Domenikos et al. . |
| 5,857,197 | 1/1999 | Mullins . |
| 5,857,201 | 1/1999 | Wright, Jr. et al. . |
| 5,864,669 | 1/1999 | Osterman et al. . |
| 5,864,683 | 1/1999 | Boebert et al. . |
| 5,875,291 | 2/1999 | Fox . |
| 5,881,225 | 3/1999 | Worth . |
| 5,884,316 | 3/1999 | Bernstein et al. ................... 707/103 |
| 5,884,327 | 3/1999 | Cotner et al. . |
| 5,889,942 | 3/1999 | Orenshteyn . |
| 5,889,957 | 3/1999 | Ratner et al. . |
| 5,890,161 | 5/1999 | Helland et al. . |
| 5,907,675 | 5/1999 | Aahlad . |
| 5,933,593 * | 8/1999 | Arun et al. ............................. 714/6 |
| 5,941,947 | 8/1999 | Brown et al. . |
| 5,958,004 | 9/1999 | Helland et al. . |
| 5,958,010 | 9/1999 | Agarwal et al. . |
| 6,026,428 | 2/2000 | Hutchison et al. . |
| 6,061,796 | 5/2000 | Chen et al. . |
| 6,105,147 * | 8/2000 | Molloy ................................. 714/16 |

OTHER PUBLICATIONS

Gray & Reuter, "Log Manager," Transaction Processing: Concepts and Techniques, Morgan Kaufmann Publishers, San Francisco, CA, chapter 9, pp. 493–525 (1993).

Chappell, "Microsoft Message Queue is a Fast, Efficient Choice for Your Distributed Application," MSJ 13:17–24 (Jul. 1998).

Bukovec and Dievendorff, "Use MSMQ and MTS to Simplify the Building of Transactional Applications," MSJ 13:27–40 (Jul. 1998).

"MSMQ Reference," MSDN Library—Jul. 1998, pp. 1–87 (1998).

Lam, "Building Scalable Apps," PC Tech Magazine, pp. 209–214 (Apr. 1998).

Tomsen, "Virtually Crash–Proof your Web site with IIS 4.0," Microsoft Interactive Developer, 2:10, pp. 41–46 (Oct. 1997).

Hackathorn, R., "Publish or Perish,—Solutions to overworked networks and unruly software distribution are just part of P&S," BYTE Magazine, (Sep. 1997).

Matena et al., "Enterprise JavaBeans™," Version 1.0 Specifications, Sun Microsystems, pp. 1–181 (Mar. 21, 1998).

Sessions, COM and DCOM:Microsoft's Vision for Distributed Objects, Chapter 6, Sharing and Scalability, pp. 249–313, 1998.

Sessions, COM and DCOM: Microsoft's Vision for Distributed Objects, Chapter 10, "Clustering," pp. 413–442, 1998.

R. Limprecht, "Microsoft Transaction Server", IEEE, pp. 14–18 (Feb. 1997).

G. Eddon, "COM+: The Evolution of Component Services", IEEE on Computer, pp. 104–106 (Jul. 1999).

Object Transaction Services, OMG document 94.6.1 (Jun. 1994).

(No author given) "Transaction Context Objects in Microsoft TRansaction Server", MSDN, pp (2) (Jun. 1997).

D. Chappell, "The Microsoft Transaction Server (MTS)—Transactions Meet Components", white paper, Microsoft-.com (Jun. 1997).

"Implementing Locale As Dynamically Loaded Shared Object Files", ibm Technical Disclosure Bulletin, US, IBM Corp., New York, vol. 34, No. 12, pp. 117–118 XP000308454 ISSN: 0018–8689—the whole document, May 1992.

Tripathi, A.R. et al.: Design Of A Remote Procedure Call System For Object–Oriented Distributed Programming, Software Practice & Experience, GB, John Wiley & Sons Ltd., Chichester, vol. 28, No. 1, pp. 23–47 XP000723715, ISSN: 0038–0644—the whole document, Jan. 1998.

Barkley, "Role Based Access Control (RBAC)," Software Diagnostics and Conformance Testing National Institute of Standards and Technology (Mar. 1998).

Gavrila and Barkley, "Formal Specification for Role Based Access Control User/Role and Role/Role Relationship Management," (Oct. 1998).

Barkley, "Application Engineering in Health Care," pp. 1–7 (May 9, 1995).

Cugini and Ferraiolo, "Role Based Access Control Slide Set—May 1995," National Institute of Standards and Technology (1995).

Smith, Sr. et al., "A Marketing Survey of Civil Federal Government Organizations to Determine the Need for a Role–Based Access Control (RBAC) Security Product," Seta Corporation (Jul. 1996).

Ferraiolo and Barkley, "Specifying and Managing Role––Based Access Control within a Corporate Intranet," (1997).

Ferraiolo et al., "Role–Based Access Control (RBAC): Features and Motivations," (1995).

Kuhn, "Mutual Exclusion of Roles as a Means of Implementing Separation of Duty in Role–Based Access Control Systems," (1997).

Barkley, "Comparing Simple Role Based Access Control Models and Access Control Lists," (1997).

Barkley et al., "Role Based Access Control for the World Wide Web," (1997).

Ferraiolo and Kuhn, "Role–Based Access Control," Reprinted from Proceedings of 15$^{th}$ National Computer Security Conference (1992).

Barkley, "Implementing Role Based Access Control Using Object Technology," (1995).

Tucker (editor), "The Computer Science and Engineering Handbook," chapter 49, pp. 1112–1124 and chapter 91, pp. 1929–1948 (1996).

Adams et al., "Pointer and Run–time Allocation," C++ *An Introduction to Computing,* chapter 15, pp. 860–869 (1995).

Brockschmidt, Inside OLE (second edition), chapter 5, pp. 219–276 and chapter 22, pp. 1011–1063 (1995).

"Java Remote Method Invocation Specification," *Java Development Kit (JDK),* vol. 1, Sun Microsystems, Inc., (1996,1997).

J. Steinman, "Incremental State Saving in Speedes Using C++," IEEE, pp. 687–696, 1993.

R. Limprecht, "Microsoft Transaction Server," IEEE Compcon '97, pp. 14–18.

Orfali, Harkey, Edwards, "Essential Client/Server Survival Guide," pp. 241–288 (1994).

Franklin, "Concurrency Control and Recovery," *The Computer Science and Engineering Handbook,* pp. 1058–1077 (1997).

* cited by examiner

DISABLING AND ENABLING TRANSACTION COMMITTAL IN TRANSACTIONAL APPLICATION COMPONENTS

CONTINUING APPLICATION DATA

This application is a continuation of U.S. patent application Ser. No. 08/959,142, filed Oct. 28, 1997, now U.S. Pat. No. 5,958,004.

FIELD OF THE INVENTION

The present invention relates to a server application programming model using software components, and more particularly relates to the component having control over whether a transaction in which the component participates can be committed.

BACKGROUND AND SUMMARY OF THE INVENTION

In many information processing applications, a server application running on a host or server computer in a distributed network provides processing services or functions for client applications running on terminal or workstation computers of the network which are operated by a multitude of users. Common examples of such server applications include software for processing class registrations at a university, travel reservations, money transfers and other services at a bank, and sales at a business. In these examples, the processing services provided by the server application may update databases of class schedules, hotel reservations, account balances, order shipments, payments, or inventory for actions initiated by the individual users at their respective stations.

Often, server applications require coordinating activities on multiple computers, by separate processes on one computer, and even within a single process. For example, a money transfer operation in a banking application may involve updates to account information held in separate databases that reside on separate computers. Desirably, groups of activities that form parts of an operation are coordinated so as to take effect as a single indivisible unit of work, commonly referred to as a transaction. In many applications, performing sets of activities as a transaction becomes a business necessity. For example, if only one account is updated in a money transfer operation due to a system failure, the bank in effect creates or loses money for a customer.

A transaction is a collection of actions that conform to a set of properties (referred to as the "ACID" properties) which include atomicity, consistency, isolation, and durability. Atomicity means that all activities in a transaction either take effect together as a unit, or all fail. Consistency means that after a transaction executes, the system is left in a stable or correct state (i.e., if giving effect to the activities in a transaction would not result in a correct stable state, the system is returned to its initial pre-transaction state). Isolation means the transaction is not affected by any other concurrently executing transactions (accesses by transactions to shared resources are serialized, and changes to shared resources are not visible outside the transaction until the transaction completes). Durability means that the effects of a transaction are permanent and survive system failures. For additional background information on transaction processing, see, inter alia, Jim Gray and Andreas Reuter, *Transaction Processing Concepts and Techniques*, Morgan Kauffmann, 1993.

In many current systems, services or extensions of an operating system referred to as a transaction manager or transaction processing (TP) monitor implement transactions. A transaction is initiated by a client program, such as in a call to a "begin$_{13}$ transaction" application programming interface (API) of the transaction monitor. Thereafter, the client initiates activities of a server application or applications, which are performed under control of the TP monitor. The client ends the transaction by calling either a "commit_transaction" or "abort_transaction" API of the TP monitor. On receiving the "commit_transaction" API call, the TP monitor commits the work accomplished by the various server application activities in the transaction, such as by effecting updates to databases and other shared resources. Otherwise, a call to the "abort_transaction" API causes the TP monitor to "roll back" all work in the transaction, returning the system to its pre-transaction state.

In systems where transactions involve activities of server applications on multiple computers, a two-phase commit protocol often is used. In general, the two-phase commit protocol centralizes the decision to commit, but gives a right of veto to each participant in the transaction. In a typical implementation, a commit manager node (also known as a root node or transaction coordinator) has centralized control of the decision to commit, which may for example be the TP monitor on the client's computer. Other participants in the transaction, such as TP monitors on computers where a server application performs part of the work in a transaction, are referred to as subordinate nodes. In a first phase of commit, the commit manager node sends "prepare_to_ commit" commands to all subordinate nodes. In response, the subordinate nodes perform their portion of the work in a transaction and return "ready_to_commit" messages to the commit manager node. When all subordinate nodes return ready_to_commit messages to the commit manager node, the commit manager node starts the second phase of commit. In this second phase, the commit manager node logs or records the decision to commit in durable storage, and then orders all the subordinate nodes to commit their work making the results of their work durable. On committing their individual portions of the work, the subordinate nodes send confirmation messages to the commit manager node. When all subordinate nodes confirm committing their work, the commit manager node reports to the client that the transaction was completed successfully. On the other hand, if any subordinate node returns a refusal to commit during the first phase, the commit manager node orders all other subordinate nodes to roll back their work, aborting the transaction. Also, if any subordinate node fails in the second phase, the uncommitted work is maintained in durable storage and finally committed during failure recovery.

In transaction processing, it is critical that the client does not pre-maturely commit a server application's work in a transaction (such as database updates). For example, where the activity of a server application in a transaction is to generate a sales order entry, the server application may impose a requirement that a valid sales order entry have an order header (with customer identifying information filled in) and at least one order item. The client therefore should not commit a transaction in which the server application generates a sales order before both an order header and at least one order item in the sales order has been generated. Such application-specific requirements exist for a large variety of server application activities in transactions.

Historically, pre-mature client committal of a server application's work in a transaction generally was avoided in two ways. First, the server application can be programmed such that its work in a transaction is never left in an incomplete state when returning from a client's call. For example, the server application may implement its sales order generation code in a single procedure which either generates a valid sales order complete with both an order header and at least one order item, or returns a failure code to cause the client to abort the transaction. The server application's work thus is never left in an incomplete state between calls from the client, and would not be committed prematurely if the client committed the transaction between calls to the server application.

Second, the client and server application typically were developed together by one programmer or a group of programmers in a single company. Consequently, since the programmers of the server application and client were known to each other, the server application programmers could ensure that the client was not programmed to commit a transaction between calls that might leave the server application's work in an incomplete state. For example, the client's programmers could be told by the server application programmers not to call the commit_transaction API after a call to the server application that sets up an order header and before a call to the server application that adds an order item.

These historical approaches to avoiding pre-mature committal of server application work in a transaction are less effective for, and in some ways antithetical to, component-based server applications that are programmed using object-oriented programming techniques.

In object-oriented programming, programs are written as a collection of object classes which each model real world or abstract items by combining data to represent the item's properties with functions to represent the item's functionality. More specifically, an object is an instance of a programmer-defined type referred to as a class, which exhibits the characteristics of data encapsulation, polymorphism and inheritance. Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related member functions of the object. In other words, the client programs do not access the object's data directly, but must instead call functions on the object's interfaces to operate on the data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class.

Object-oriented programming generally has advantages in ease of programming, extensibility, reuse of code, and integration of software from different vendors and (in some object-oriented programming models) across programming languages. However, object-oriented programming techniques generally are antithetical to the above described historical approaches to avoiding pre-mature committal of server application work.

First, object-oriented programming techniques encourage accomplishing work in multiple client-to-object interactions. Specifically, object-oriented programming encourages setting an object's properties in calls to separate member functions, then carrying out the work with the set properties in a call to a final member function. For example, a money transfer object may provide a set of member functions that includes a SetDebitAccount( ) function, a SetCreditAccount( ) function, a SetTransferAmount( ) function, etc. that the client program calls to set the object's properties. Finally, the client program may call a TransferMoney( ) function to cause the object to perform the money transfer operation using the accumulated object properties (also referred to as the object's state). Between these separate client-object interactions, server application work may often be left in an incomplete state. The object-oriented programming style thus is contrary to the above described approach to avoiding pre-mature committal wherein server application work is never left incomplete on return from a client call.

Second, object-oriented programming also encourages integration of objects supplied from unrelated developers and companies. When the server application is built from object classes supplied from unrelated vendors, there is less opportunity for direct collaboration between developers of the server application and the client. Without direct collaboration, the developer of an object used in a server application generally cannot ensure that the developer of a client will not commit a transaction between calls to the server application object which leave the server application's work in an incomplete state. Thus, the second above described approach to avoiding pre-mature committal also is less effective in component-based server applications.

The present invention avoids premature committal of component-based server application work by allowing a server application component to have control over whether the client can commit a transaction involving the component's work. According to one aspect of the invention, an execution environment for server application components provides functions that a server application component calls to temporarily and reversibly enable and disable, respectively, committal of a transaction in which the component participates. The component calls the function to disable committal upon returning from a client call that leaves the component's work in an incomplete state. On the other hand, if the component's work is in a complete or valid state, the component calls the function to enable transaction committal on return from the client call. The invention thus implements an approach to avoid premature committal that allows a server application to leave its transactional work in an incomplete state between client interactions, and allows easier integration of application components from independent sources (e.g., by not relying on direct collaboration between developers to avoid premature committal).

Additional features and advantages of the invention will be made apparent from the following detailed description of an illustrated embodiment which proceeds with reference to the accompanying drawings.

DETAILED DESCRIPTION OF THE ILLUSTRATED EMBODIMENTS

The present invention is directed toward a method and system for avoiding premature committal of server application work. In one embodiment illustrated herein, the invention is incorporated into an application server execution environment or platform, entitled "Microsoft Transaction Server," marketed by Microsoft Corporation of Redmond, Wash. Briefly described, this software provides a run-time environment and services to support component-based server applications in a distributed network.

Exemplary Operating Environment

Figure 1:
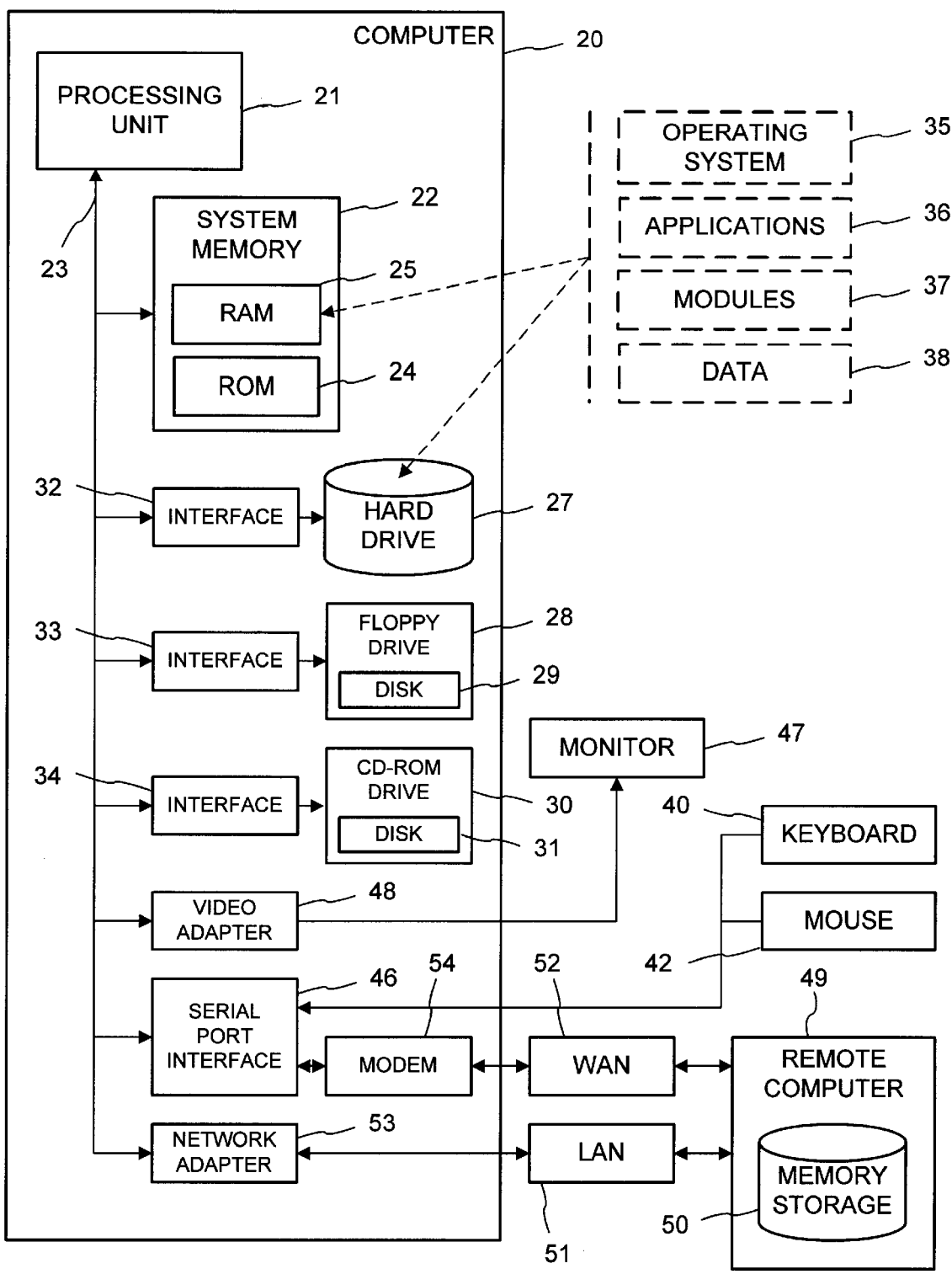
FIG. 1 is a block diagram of a distributed computer system that may be used to implement a method and apparatus embodying the invention for avoiding premature committal of work in a transaction.

FIG. 1 and the following discussion are intended to provide a brief, general description of a suitable computing environment in which the invention may be implemented. While the invention will be described in the general context of computer-executable instructions of a computer program that runs on a server computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including single- or multiprocessor computer systems, minicomputers, mainframe computers, as well as personal computers, hand-held computing devices, microprocessor-based or programmable consumer electronics, and the like. The illustrated embodiment of the invention also is practiced in distributed computing environments where tasks are performed by remote processing devices that are linked through a communications network. But, some embodiments of the invention can be practiced on stand-alone computers. In a distributed computing environment, program modules may be located in both local and remote memory storage devices.

With reference to FIG. 1, an exemplary system for implementing the invention includes a conventional server computer 20, including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system (BIOS), containing the basic routines that help to transfer information between elements within the server computer 20, such as during start-up, is stored in ROM 24.

The server computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the server computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. The operating system 35 in the illustrated server computer is the Microsoft Windows NT Server operating system, together with the before mentioned Microsoft Transaction Server.

A user may enter commands and information into the server computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, server computers typically include other peripheral output devices (not shown), such as speakers and printers.

The server computer 20 may operate in a networked environment using logical connections to one or more remote computers, such as a remote client computer 49. The remote computer 49 may be a workstation, a server computer, a router, a peer device or other common network node, and typically includes many or all of the elements described relative to the server computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the server computer 20 is connected to the local network 51 through a network interface or adapter 53. When used in a WAN networking environment, the server computer 20 typically includes a modem 54, or is connected to a communications server on the LAN, or has other means for establishing communications over the wide area network 52, such as the Internet. The modem 54, which may be internal or external, is connected to the system bus 23 via the serial port interface 46. In a networked environment, program modules depicted relative to the server computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the server computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Server Application Execution Environment

Figure 2:
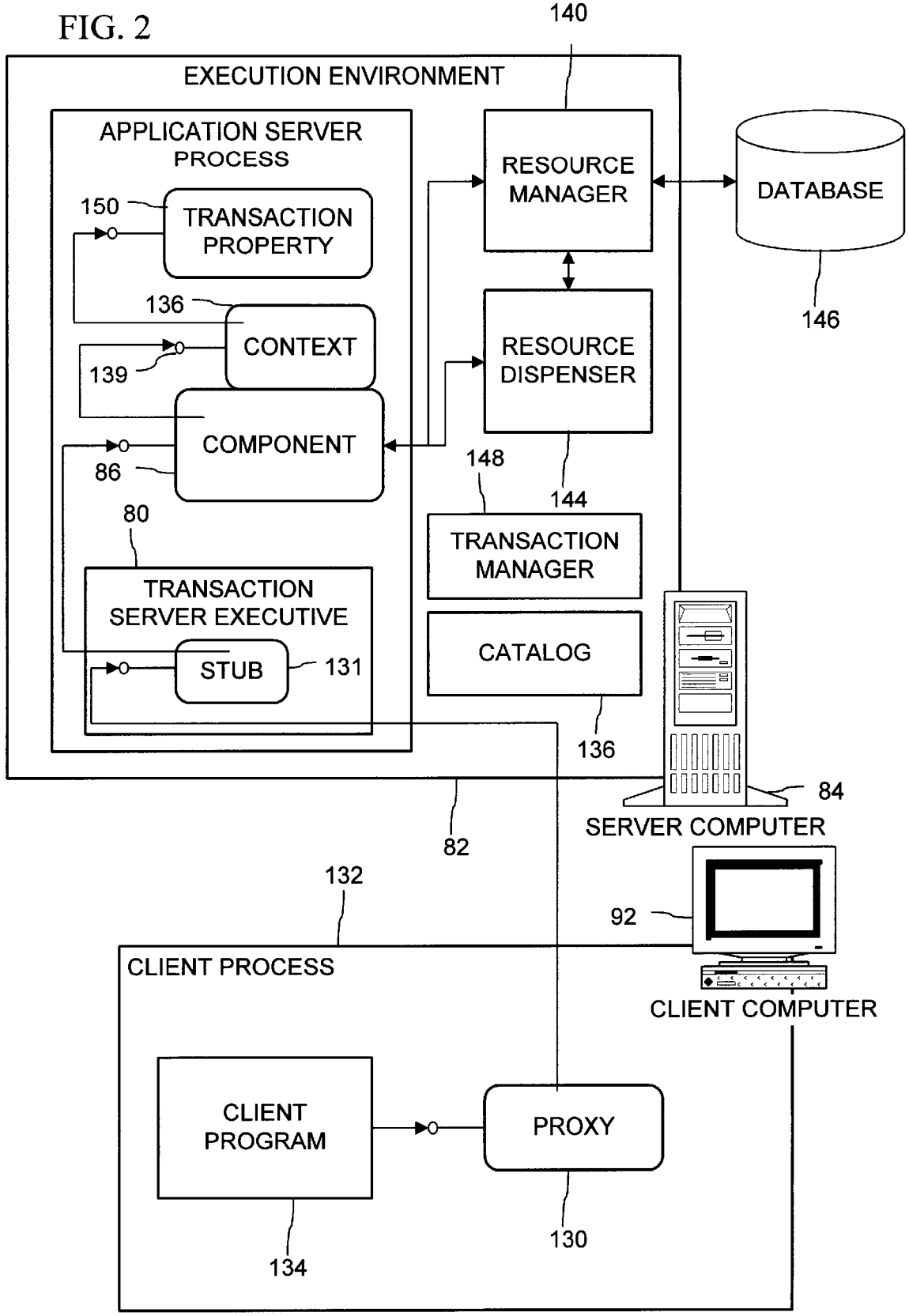
FIG. 2 is a block diagram of a server application component execution environment provided by a server executive on a server computer in the distributed computer system of FIG. 1.

With reference now to FIG. 2, a transaction server executive 80 provides run-time or system services to create a run-time execution environment 80 that supports enabling and disabling transaction committal by server application components (e.g., server application component 86) on a server computer 84. The transaction server executive 80 also provides services for thread and context management to the server application components 86. Included in the services are a set of API functions, including a GetObjectContext and a SafeRef API functions described below. Additionally, the transaction server executive 80 provides system-defined objects (including a component context object 136) that support component integration interfaces.

The illustrated transaction server executive 80 is implemented as a dynamic link library ("DLL"). (A DLL is a well-known executable file format which allows dynamic or run-time linking of executable code into an application program's process.) The transaction server executive 80 is loaded directly into application server processes (e.g., "ASP" 90) that host server application components, and runs transparently in the background of these processes.

The illustrated ASP 90 is a system process that hosts execution of server application a components. Each ASP 90 can host multiple server application components that are grouped into a collection called a "package." Also, multiple ASPs 90 can execute on the server computer under a multi-threaded, multi-tasking operating system (e.g., Microsoft Windows NT in the illustrated embodiment). Each ASP 90 provides a separate trust boundary and fault isolation domain for the server application components. In other words, when run in separate ASPs, a fault by one server application component which causes its ASP to terminate generally does not affect the server application components in another ASP. In the illustrated embodiment, server application components are grouped as a package to be run together in one ASP 90 using an administration utility called "the Transaction Server Explorer." This utility provides a graphical user interface for managing attributes associated with server application components, including grouping the components into packages.

In a typical installation shown in FIG. 2, the execution environment 80 is on the server computer 84 (which may be an example of the computer 20 described above) that is connected in a distributed computer network comprising a large number of client computers 92 which access the server application components in the execution environment. Alternatively, the execution environment 80 may reside on a single computer and host server application components accessed by client processes also resident on that computer.

Server Application Components

The server application components 86 that are hosted in the execution environment 80 of the ASP 90 implement the business logic of a server application, such as the code to manage class registrations in a university's registration application or orders in an on-line sales application. Typically, each server application comprises multiple components, each of which contains program code for a portion of the application's work. For example, a banking application may comprise a transfer component, a debit account component, and a credit account component which perform parts of the work of a money transfer operation in the application. The debit account component in this banking application example implements program code to debit a specified account in a banking database by a specified amount. The credit account component implements program code to credit a specified account in the database by a specified amount. The transfer component implements program code that uses the debit account component and credit account component to effect a money transfer between two accounts.

Figure 3:
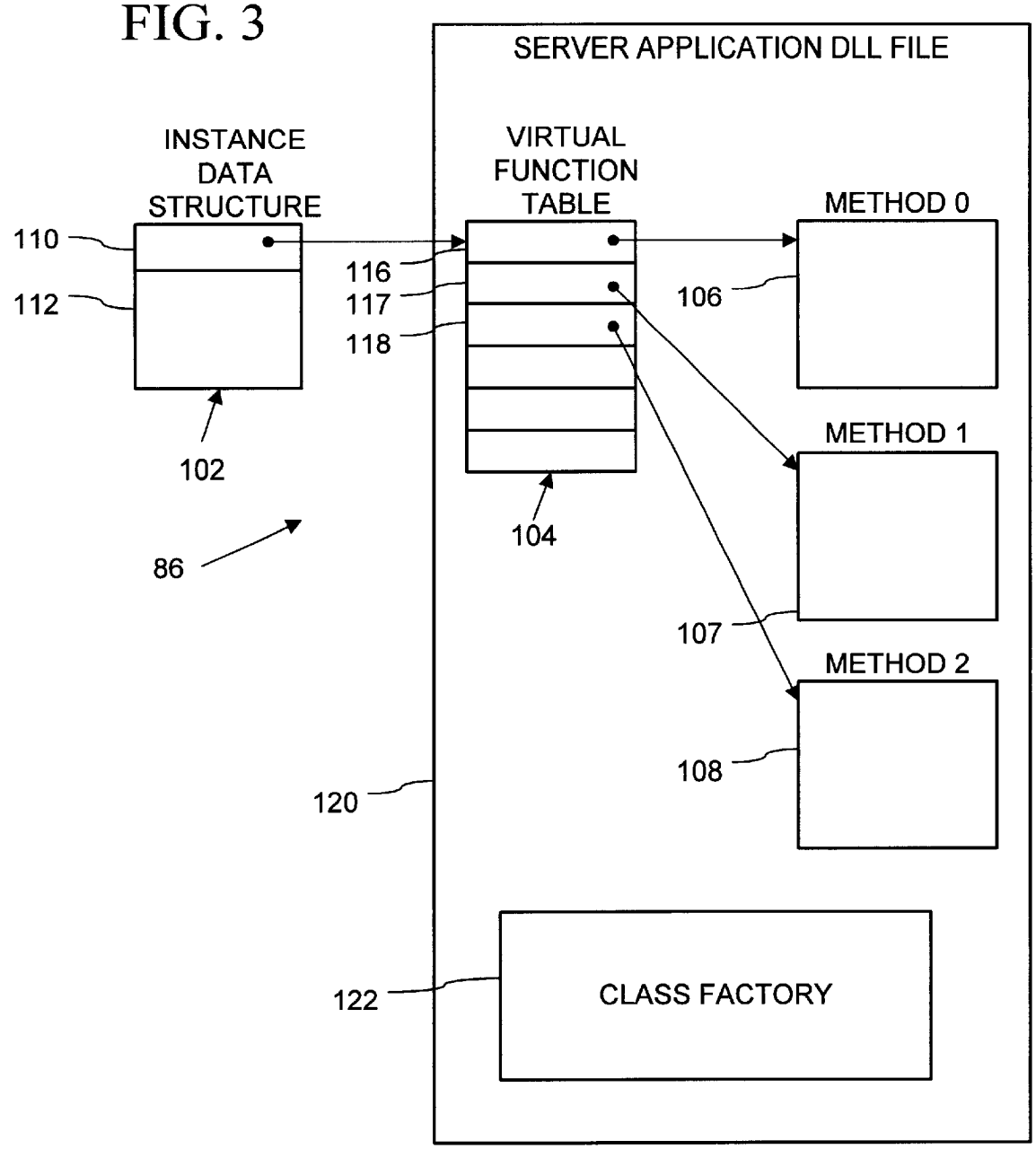
FIG. 3 is a block diagram of the structure of a server application component in the execution environment of FIG. 2.

With reference now to FIG. 3, the server application component 86 (FIG. 2) in the illustrated embodiment conforms to the Component Object Model ("COM") of Microsoft Corporation's OLE and ActiveX specifications (i.e., is implemented as a "COM Object"), but alternatively may be implemented according to other object standards including the CORBA (Common Object Request Broker Architecture) specification of the Object Management Group. OLE's COM specification defines binary standards for components and their interfaces which facilitate the integration of software components. For a detailed discussion of OLE, see Kraig Brockschmidt, *Inside OLE, Second Edition*, Microsoft Press, Redmond, Wash., 1995.

In accordance with COM, the server application component 86 is represented in the computer system 20 (FIG. 1) by an instance data structure 102, a virtual function table 104, and member functions 106–108. The instance data structure 102 contains a pointer 110 to the virtual function table 104 and data 112 (also referred to as data members, or properties of the component). A pointer is a data value that holds the address of an item in memory. The virtual function table 104 contains entries 116–118 for the member functions 106–108. Each of the entries 116–118 contains a reference to the code 106–108 that implements the corresponding member function.

The pointer 110, the virtual function table 104, and the member functions 106–108 implement an interface of the server application component 86. By convention, the interfaces of a COM object are illustrated graphically as a plug-in jack as shown for the server application component 100 in FIG. 3. Also, Interfaces conventionally are given names beginning with a capital "I." In accordance with COM, the server application component 86 can include multiple interfaces which are implemented with one or more virtual function tables. The member function of an interface is denoted as "IInterfaceName::FunctionName."

The virtual function table 104 and member functions 106–108 of the server application component 86 are provided by a server application program 120 (hereafter "server application DLL") which is stored in the server computer 84 (FIG. 2) as a dynamic link library file (denoted with a ".dll" file name extension). In accordance with COM, the server application DLL 120 includes code for the virtual function table 104 (FIG. 3) and member functions 106–108 (FIG. 3) of the classes that it supports, and also includes a class factory 122 that generates the instance data structure 102 (FIG. 3) for a component of the class.

Like any COM object, the sever application component can maintain internal state (i.e., its instance data structure 102 including data members 112) across multiple interactions with a client (i.e., multiple client program calls to member functions of the component). The server application component that has this behavior is said to be "stateful." The server application component can also be "stateless," which means the component does not hold any intermediate state while waiting for the next call from a client.

In the execution environment 80 of FIG. 2, the server application component 86 is executed under control of the transaction server executive 80 in the ASP 90. The transaction server executive 80 is responsible for loading the server application DLL 300 into the ASP 90 and instantiating the server application component 86 using the class factory 122. The transaction server executive 80 further manages calls to the server application component 86 from client programs (whether resident on the same computer or over a network connection).

The illustrated execution environment 80 imposes certain additional requirements on the server application component 86 beyond conforming with COM requirements. First, the server application component is implemented in a DLL file (i.e., the server application DLL 120 of FIG. 3). (COM objects otherwise alternatively can be implemented in an executable (".exe") file.) Second, the component's DLL file 120 has a standard class factory 122 (i.e., the DLL implements and exports the DllGetClassObject function, and supports the IClassFactory interface). Third, the server application component exports only interfaces that can be standard marshaled, meaning the component's interfaces are either described by a type library or have a proxy-stub DLL. The proxy-stub DLL provides a proxy component 130 in a client process 132 on the client computer 92, and a stub component 131 in the ASP 90 on the server computer 84. The proxy component 130 and stub component 131 marshal calls from a client program 134 across to the server computer 84. The proxy-stub DLL in the illustrated system is built using the MIDL version 3.00.44 provided with the Microsoft Win32 SDK for Microsoft Windows NT 4.0 with the Oicf compiler switch, and linked with the transaction server executive 80. These additional requirements conform to well known practices.

The client program 134 of the server application component 86 is a program that uses the server application component. The client program can be program code (e.g., an application program, COM Object, etc.) that runs outside the execution environment 80 (out of the control of the transaction server executive 80). Such client programs are referred to as "base clients." Alternatively, the client program 134 can be another server application component that also runs under control of the transaction server executive (either in the same or a separate ASP 90). The client program 134 can reside on the server computer 84 or on a separate client computer 92 as shown in FIG. 2 (in which case the client computer interacts with the server application component 86 remotely through the proxy object 130 and stub object 131).

Before the server application component 86 can execute in the illustrated execution environment 80, the server application component 86 is first installed on the server computer 84. As with any COM object, the server application component 86 is installed by storing the server application DLL file 120 that provides the server application component 86 in data storage accessible by the server computer (typically the hard drive 27, shown in FIG. 1, of the server computer), and registering COM attributes (e.g., class identifier, path and name of the server application DLL file 120, etc. as described below) of the server application component in the system registry. The system registry is a configuration database. In addition to the server application component's COM attributes, the server application is registered in the system registry with a "transaction server execution" attribute indicating that the server application component is run under control of the transaction server executive in the illustrated execution environment 80. In the illustrated embodiment, this attribute has the form shown in the following example registry entry.

$HKEY_{13}CLASSES_{13}ROOT\backslash CLSID\backslash \{AB077646\text{-}E902\text{-}11D0\text{-}B5BE\text{-}00C04FB957D8\}\backslash LocalServer32 = C:\backslash WINNT\backslash System32\backslash mtx.exe/p:\{DA16F24B\text{-}2E23\text{-}11D1\text{-}8116\text{-}00C04FC2F9C1\}$ When the server application component 86 is run in the execution environment 80, the transaction server executive 80 maintains a component context object 138 associated with the server application component 86. The component context object 138 provides context for the execution of the server application component 86 in the execution environment 80. The component context object 138 has a lifetime that is coextensive with that of the server application component. The transaction server executive 80 creates the component context object 138 when the server application component 86 is initially created, and destroys the component context object 138 after the application server component 86 is destroyed (i.e., after the last reference to the application server component is released).

The component context object 138 contains intrinsic properties of the server application component that are determined at the component's creation. These properties include a client id, an activity id, and a transaction reference. The client id refers to the client program 134 that initiated creation of the server application component. The activity id refers to an activity that includes the server application component. An activity is a set of components executing on behalf of a base client, within which only a single logical thread of execution is allowed. The transaction reference indicates a transaction property object 150 that represents a transaction in which the server application component participates. The component context object 138 is implemented as a COM Object that runs under control of the transaction server executive. The component context object 138 provides an "IObjectContext" interface described in more detail below, that has member functions called by the server application component 86.

In the illustrated execution environment, the transaction server executive 80 maintains an implicit association of the component context object 138 to the server application component 86. In other words, the transaction server executive 80 does not pass a reference of the component context object 138 to the client program 134 which uses the server application component 86. Rather, the transaction server executive 80 maintains the component's association with the context object, and accesses the component context object when needed during the client program's access to the server application component 86. Thus, the client program 134 is freed from explicitly referencing the component context object 138 while creating and using the server application component 86.

With reference again to FIG. 2, the server computer 84 also runs a resource manager 140 and a resource dispenser 144. The resource manager 140 is a system service that manages durable data (e.g., data in a database 146). The server application component 86 can use the resource manager to maintain the durable state of the server application (such as, the record of inventory on hand, pending orders, and accounts receivable in an on-line sales server application). Examples of resource managers in the illustrated embodiment include the Microsoft SQL Server, durable message queues, and transactional file systems. Preferably, the resource manager 140 supports performing changes or updates by the server application component 86 to the server application's durable state on a transactional basis (i.e., in transactions conforming to the well-known ACID properties).

The resource dispenser 144 is a service that manages non-durable shared state (i.e., without the guarantee of durability) on behalf of the server application components within the ASP 90. Examples of the resource dispenser 144 in the illustrated embodiment include an ODBC resource dispenser that maintains a pool of database connections conforming to the Microsoft Open Database Connectivity ("ODBC") call level interface. The ODBC resource dispenser allocates database connections to the server application component for accessing data from a database 146 (generally, through its resource manager 140). Also, the ODBC resource dispenser reclaims database connections when released by the server application components for later reuse.

The illustrated execution environment 82 further includes a transaction manager 148. The transaction manger 148 is a system service that coordinates transactions that span multiple resource managers, including where the resource managers reside on more than one server computer in a distributed network. The transaction manager 148 ensures that updates across all resources managers involved in a transaction occur in conformance with the ACID properties using the well known two-phase commit protocol, regardless of failures (e.g., computer or network hardware or software failures, or errors caused by a misbehaved resource manager or application), race conditions (e.g., a transaction that starts to commit while one resource manager initiates an abort), or availability (a resource manager prepares a transaction but never returns). The illustrated transaction manager 148 is the Microsoft Distributed Transaction Coordinator (MSDTC) released as part of Microsoft SQL Server 6.5.

Transaction Processing With Server Application Components

The illustrated execution environment 80 also provides support for transaction processing conforming to the ACID properties and using the well known two phase commit protocol. In the illustrated execution environment 80, one or more server application components that participate in a transaction (i.e., an atomic unit of work that is either done in its entirety or not at all) will each have a transaction property object 150 associated with their component context object 136 to represent the transaction. The transaction server executive 80 creates the transaction property object 150 when the transaction is initiated, and associates the transaction property object with the component context object of each server application component in the transaction.

While the server application component 86 is associated with the transaction property object 150, the transaction server executive automatically associates the transaction property object 150 with any other server application object that is created by the server application component 86 or resource that is obtained by the server application component 86. For example, a money transfer operation in an on-line banking server application can be implemented in a "transfer" server application component that creates two "account" server application components to debit and credit the transferred amount to the affected accounts. Thus, when the transfer component creates the account components, the transaction server executive automatically associates the account components with the transfer component's transaction property object so that work of the individual account component in the money transfer is performed as a single atomic action. Also, any resources obtained by the server application component 86 from the resource manager 140 or resource dispenser 144 are associated with the component's transaction property object 150 so that services performed by the resource manager or dispenser on the component's behalf also are encompassed within the transaction. For example, when the server application component 86 allocates a database connection using the ODBC Resource Dispenser while associated in a transaction, the connection is automatically enlisted on the transaction. All database updates using the connection become part of the transaction, and are either atomically committed or aborted.

Transaction Attribute

In addition to registering COM attributes and the transaction server execution attribute in the system registry, the server application component 86 also is registered in a transaction server catalog 136. The transaction server catalog 136 is a configuration database that stores the attributes of the server application component 86 related to execution of the component in the illustrated execution environment 80. These attributes include a transaction attribute that represents the server application component's transactional expectations, and controls participation of the server application component in transaction processing under the illustrated execution environment 80. In the illustrated embodiment, the server application component's attributes can be modified by a system administrator or like user using the transaction server explorer utility which provides a component property sheet (a graphical user interface dialog) with user interface controls for setting the attributes.

The component's transaction attribute can be declared as one of the values, "not supported," "supported," "required," or "requires new." The not supported value of the transaction attribute indicates the component should not be run in the scope of a transaction. This value is a default setting, and is primarily intended for use with COM objects that are not specifically designed to execute in the illustrated execution environment (such as those that predate the invention).

The supported value indicates the component can execute in the scope of their client's transaction. The supported value typically is assigned to a server application component when the work of the component alone need not be in a transaction, such as where the component itself performs only a single database update. But, the component's work also can form part of a transaction, such as where the component's database update is made in combination with those of other components. In the above mentioned example of a banking application that provides a debit account component, a credit account component and transfer component, the debit account component and credit account component are examples of components that each implement only a single database update (i.e., a credit or debit to an account balance in a database record). The debit and credit account components can be used in operations where a transaction is not required, such as a deposit or withdrawal operation involving only the component's single database update. As mentioned above, the transfer component also uses the debit and credit account components in a money transfer operation between two accounts which involves multiple database updates (i.e., the debit by the debit account component and credit by the credit account component). In such case, the debit and credit account components should both execute within the transfer component's transaction so that the updates occur as an atomic unit of work. The debit and credit account components thus have the transactional expectation that they execute in the scope of their client's transaction, if any, which is represented by assigning the "supported value" to their transaction attribute.

The required value, on the other hand, indicates the component must execute within the scope of a transaction (either their client's transaction or a new transaction if their client has no transaction). The required value typically is assigned to components that perform multiple database updates, and require a transaction to ensure the updates are effected atomically. In the above mentioned banking application example, the transfer component implements a money transfer operation involving multiple database updates (i.e., the debit and credit performed by the debit and credit account components) which must be effected atomically. The transfer component thus has the transactional expectation that its work must be in a transaction, which is represented by assigning the required value as its transaction attribute.

In the illustrated execution environment 82, both the supported and required values allow the server application component to be run in the client's transaction. In other words, if the client program 134 that requested creation of the server application component has a transaction, the server application component is run in the client's transaction. The difference between the values occurs when the component's client has no transaction. When the transaction attribute is supported and the component's client has no transaction, the server application component also executes without a transaction. When the transaction attribute is required and the component's client has no transaction, the transaction server executive initiates and executes the component in a new transaction.

The requires new value of the transaction attribute indicates the component must execute in a new transaction even if the component's client has a transaction. This causes the transaction server executive 80 to always create an independent transaction for the component. The requires new transaction attribute value can be used, for example, with an auditing component that records work done on behalf of another transaction regardless of whether the original transaction commits or aborts.

Automatic Transactions

Figure 4:
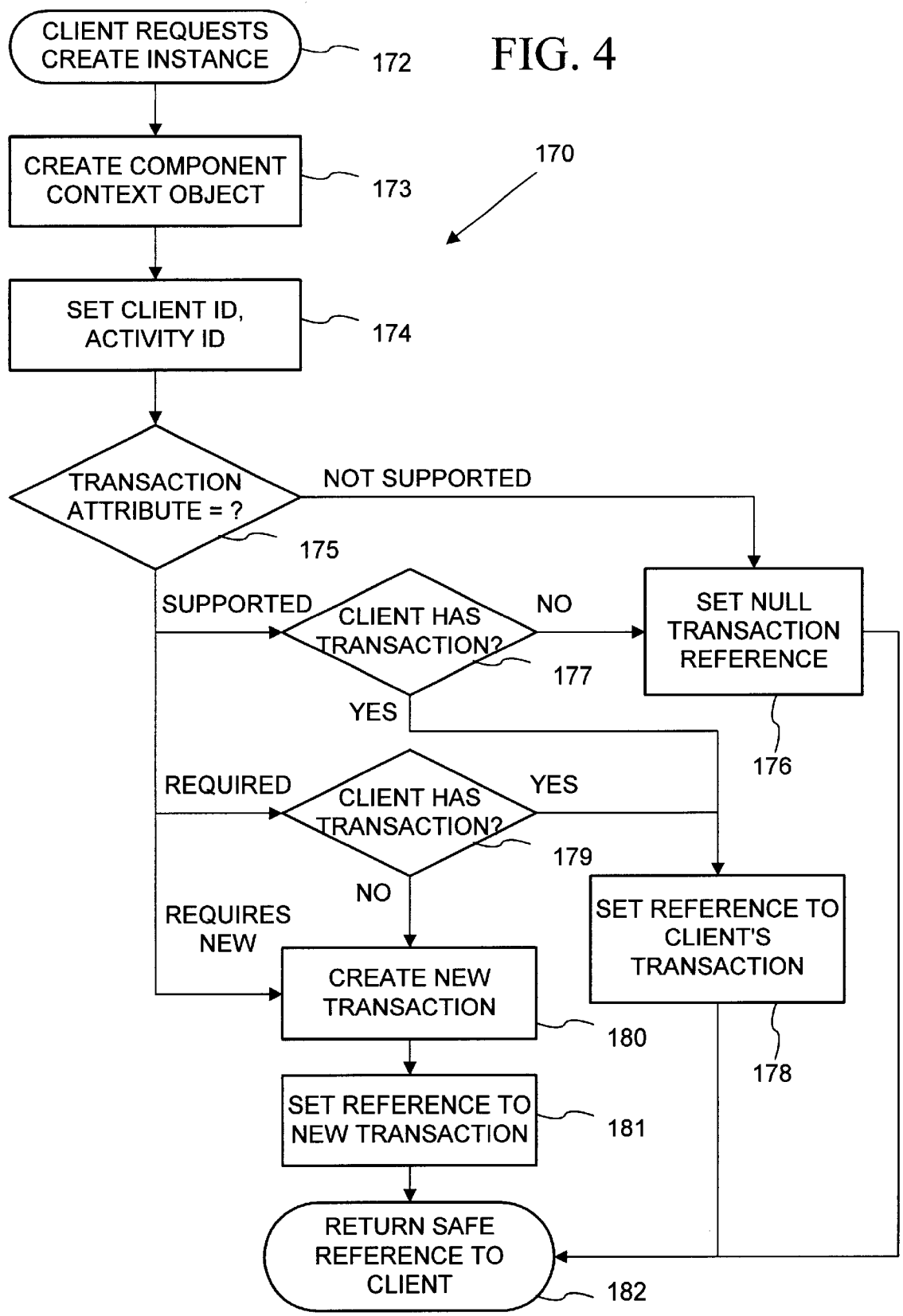
FIG. 4 is a flow chart of a method performed by the server executive in the execution environment of FIG. 2 to automatically control transaction processing of server application components' work.

With reference to FIG. 4, the transaction server executive 80 automatically provides a transaction for the server application component 86 in a method 170 according to the component's transactional expectations (i.e., transaction attribute) without client control. As indicated at step 172, the method 170 commences when the client program 134 initially requests creation of an instance of the server application component. (There are various ways for the client program 134 to make this request as discussed more fully in a following section, entitled "Creating The Server Application Component." However, the transaction server executive 80 follows the method 170 in each case.)

Upon receiving the client program's request to instantiate the server application component, the transaction server executive 80 creates the component context object 138 for the server application component 86 at a step 173. At a step 174, the transaction server executive 80 sets the client id and activity id data properties of the component context object 138 to indicate the client program 134 and activity associated with the client program, respectively. The transaction server executive 80 next sets the component context object's transaction data property in steps 175–181.

At step 175, the transaction server executive 80 checks the transaction attribute registered for the server application component 138 in the catalog 136. As discussed above, the transaction attribute represents the transactional expectations of the server application component 86. If the transaction attribute is set to not supported, the transaction server executive 80 sets the transaction data property of the component context object 138 to a null transaction reference at step 176, which means the server application component is not part of a transaction.

However, if the transaction attribute check at step 175 shows that the transaction attribute is registered as supported, the transaction server executive 80 further checks at step 177 whether the client program 134 has a transaction. If so, the transaction server executive 80 at step 178 sets the transaction data property of the component context object 134 to reference the client program's transaction (more specifically, to reference the transaction context object that represents the client program's transaction). As discussed above, this results in the server application component running under control of the transaction, such that the server application component's work (i.e., database updates) is committed or aborted with the transaction. However, if the check at step 177 indicates the client program 134 does not have a transaction, the transaction server executive 80 sets the transaction data property of the component context object 138 to a null transaction reference at step 176, which results in the server application component running outside the scope of a transaction and the component's work succeeds or fails on an individual basis.

On the other hand, if the transaction attribute check at step 175 shows the transaction attribute is registered as required, the transaction server executive 80 at a step 179 further checks whether the client has a transaction. This time, if the client has a transaction, the transaction server executive 80 also proceeds to set the component context object's transaction data property to reference the client program's transaction at step 178. However, if the client program 134 does not have a transaction, the transaction server executive 80 instead creates a new transaction context object to represent a new transaction at a step 180 and sets the transaction data property to reference the new transaction at a step 181.

Otherwise, when the transaction attribute check at step 175 shows the server application component's transaction attribute is registered as requires new, the transaction server executive 80 directly proceeds to create the new transaction and set the transaction data property to reference the new transaction in steps 180–181.

The transaction server executive 80 finally returns a safe reference to the client program at a step 182 with which the client program can invoke member functions of the server application component 86 as discussed below in the section entitled "Safe References".

Thus, according to the method 170, the transaction server executive 80 automatically provides a transaction encompassing the server application component's work when the component's transaction attribute indicates a transaction is required and the client program has not initiated a transaction (as shown in steps 175, 179–181). Also, the transaction server executive 80 automatically provides a transaction independent of the client program where the component's transaction attribute (i.e., "requires new") indicates a separate transaction is expected (as shown in steps 175, 180–181). However, where the component's transactional expectations allow the component to execute in a transaction under control of the client program (e.g., the "supported" and "required" transaction attribute) and the client program has initiated a transaction, the transaction server executive 80 runs the server application component in the client-controlled transaction.

Controlling Transaction Outcome

In the illustrated execution environment 82 (FIG. 2), the transaction manager 148 decides the outcome of a transaction based on success or failure of the work done by the transaction's participants, and completes the transaction accordingly (either aborting or committing) so as to conform to the ACID principles. Participants in the transaction can affect the transaction outcome in various ways.

Client Control of Transaction Outcome

A base client (i.e., where the client program 134 of the server application component 86 executes outside the execution environment 82 as illustrated in FIG. 2) can control transaction outcome in the illustrated execution environment using a transaction context object (not shown). The transaction context object provides an ITransactionContext interface (described below) through which the client program 134 controls the transaction. The client program 134 calls member functions of this interface to create server application components that participate in a transaction (the "CreateInstance" member function), and to commit or abort the transaction (the "Commit" and "Abort" member functions). The transaction context object has its transaction attribute set to required, or alternatively requires new, such that the transaction server executive automatically initiates a transaction for the object when created. The implementation of the commit and abort member functions in the transaction context object call the IObjectContext::SetComplete and IObjectContext::SetAbort functions, respectively, to cause an attempt to commit or abort the transaction as described below under the Completion of Automatic Transactions section.

Server Application Component Control of Transaction Outcome

The server application component 86, on the other hand, can affect the outcome of a transaction using "SetComplete," "SetAbort," "EnableCommit and DisableCommit" member functions (described in more detail below) of its component context object's IObjectContext interface. When the server application component 86 has done its portion of the work in a transaction, the component calls either the SetComplete or SetAbort member functions. By calling the SetComplete member function, the server application component 86 indicates its work in the transaction is done satisfactorily.

On the other hand, the server application component 86 calls the SetAbort member function to indicate that its processing in the transaction is done, but the work could not be completed successfully and must be aborted. For example, a debit account component in a server application which updates an account from which money is transferred in a money transfer transaction may call SetComplete when the update leaves a positive balance in the account, but calls SetAbort when the update would leave a negative account balance. The call to SetAbort in this case also causes other work in the transaction to be "rolled back," such work by a credit account component to add the transfer amount to the transferee account.

Enabling and Disabling Committal of a Transaction

In accordance with the invention, the server application component 86 additionally can affect the outcome of a transaction by calling the DisableCommit function of its component context object 136. The DisableCommit function call prevents the client from committing the transaction (referred to as "disabling commit"). This allows a server application component that is stateful to prevent premature committal of incomplete work when returning from a call from the client to the server application component. If the client 134 attempts to commit the transaction in which a server application component has disabled commit, the transaction server executive 80 causes the transaction to abort.

For example, where a valid update to an orders database is required to include both an order header and at least one order item, a server application component (hereafter the "order component") that generates updates to the database may have an AddHeader function and an AddItem function that the client calls to set header information and order items, respectively, for an update. When returning from a call to the AddHeader function where no order item has yet been added, the order component can call the DisableCommit function of its component context object 136 to disable commit in a transaction that encompasses the update. Likewise, when returning from a call to the AddItem function where no order header has yet been added, the order component can call the DisableCommit function to disable commit in the transaction. This prevents the client from committing the transaction while the order component's update is not yet valid.

Later, the server application component 86 can call the EnableCommit function of its component context object 136 to again allow the client to commit the transaction involving the server application component. The EnableCommit call indicates the server application component's work is in a valid state that may be committed, and not that the component's work in the transaction is necessarily done. Thus, in the forgoing order component example, the order component can call the EnableCommit function upon return from a call to either the AddHeader or Additem function where the update has both an order header and at least one order item. The order component's work in the transaction isn't necessarily done at that point since the client may again call the Additem function to add additional order items to the update.

In the illustrated execution environment 82, the component context object 136 maintains a "work state" value which indicates a state of work of its associated server application component 86 in the transaction. Initially, the work state value indicates an enable commit state. The component context object 136 sets the work state value to indicate a disable commit state in response to the component's call to the DisableCommit function. In response to the EnableCommit or SetComplete functions, the component context object 136 resets the work state value to indicate the enable commit state.

Example of Enabling and Disabling Commit in Transaction Processing

Figure 5:
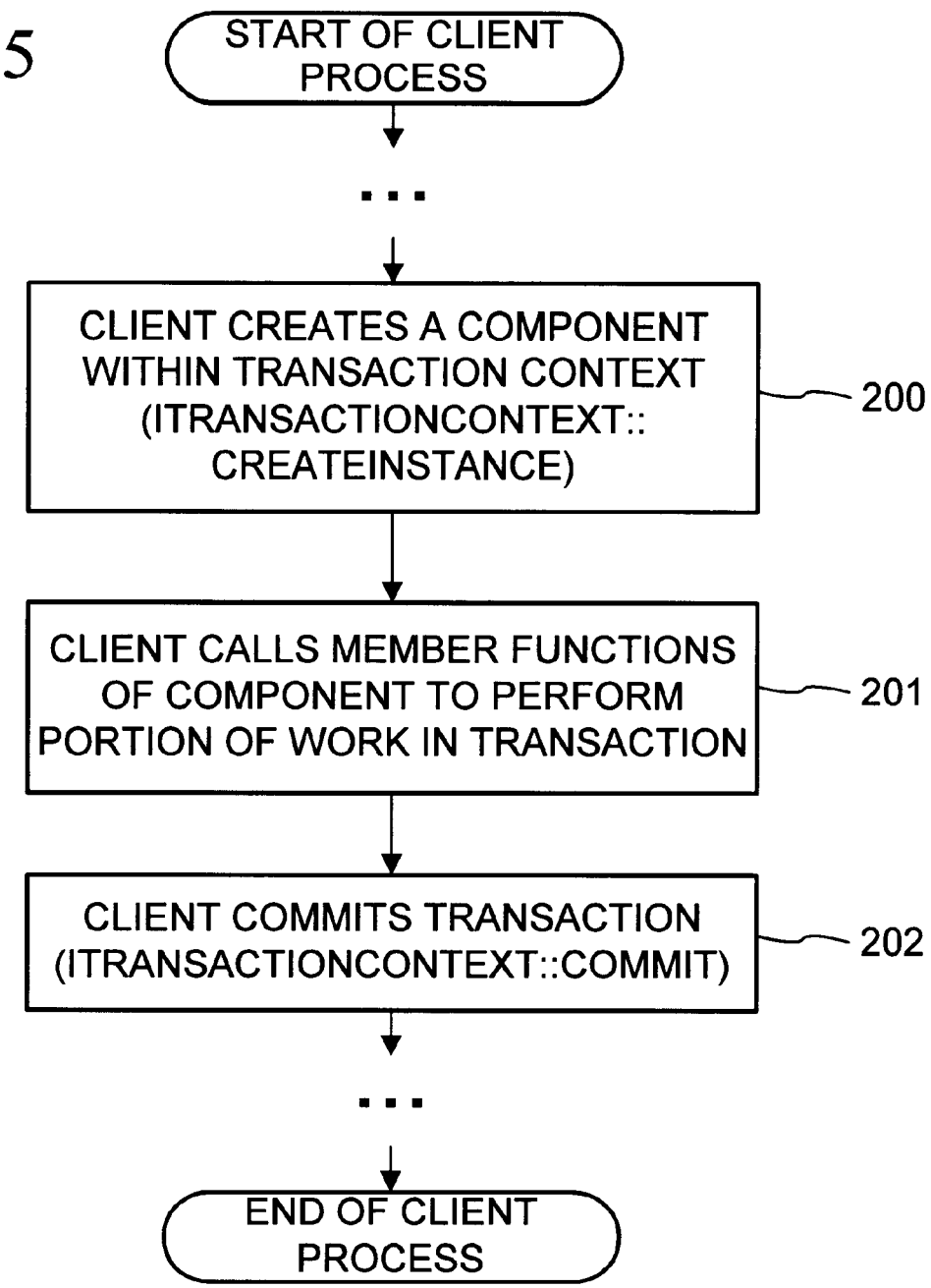
FIGS. 5–7 are flow charts illustrating use of disable commit and enable commit during transaction processing in a client process, server application component, and transaction manager within the execution environment of FIG. 2.
Figure 6:
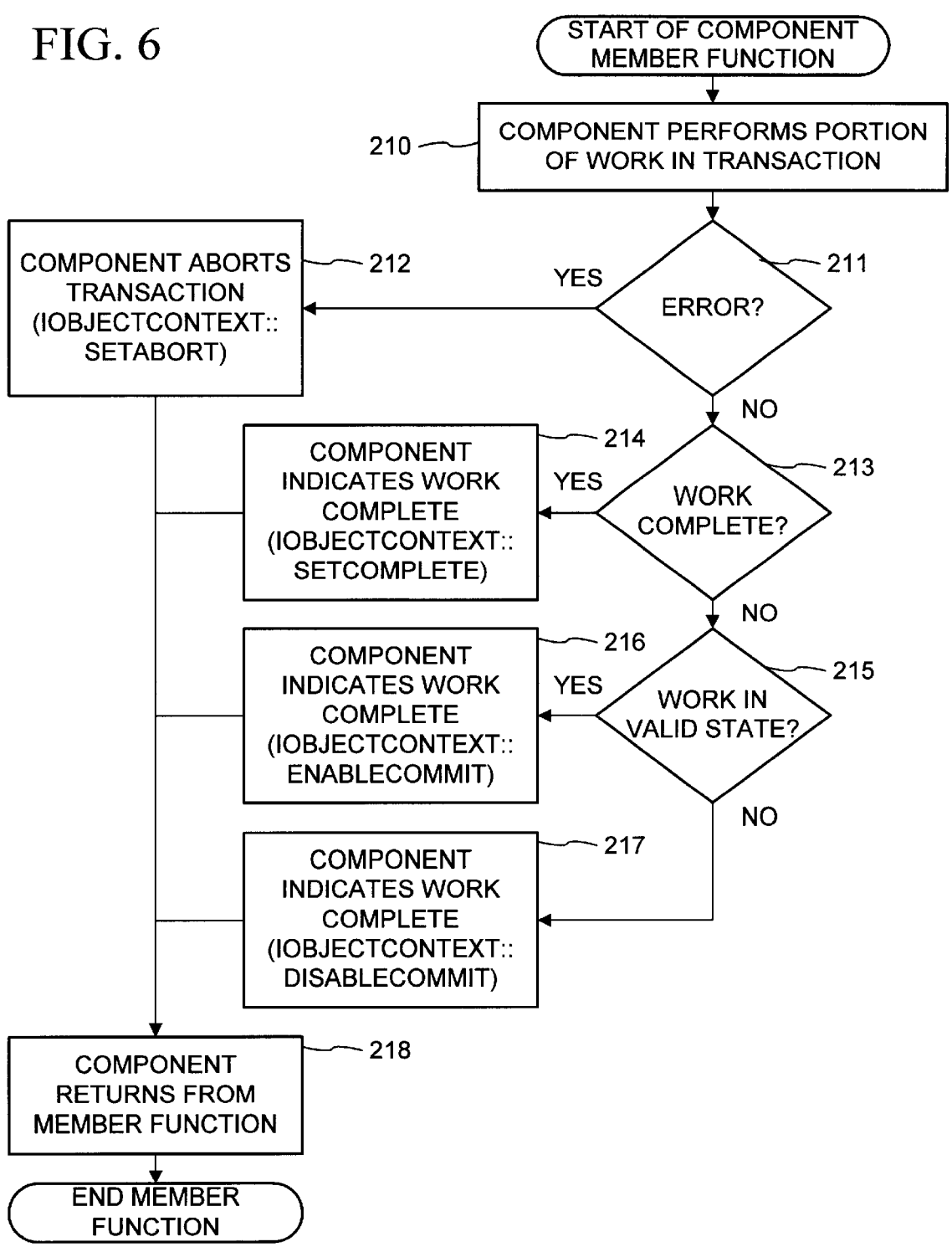
Figure 7:
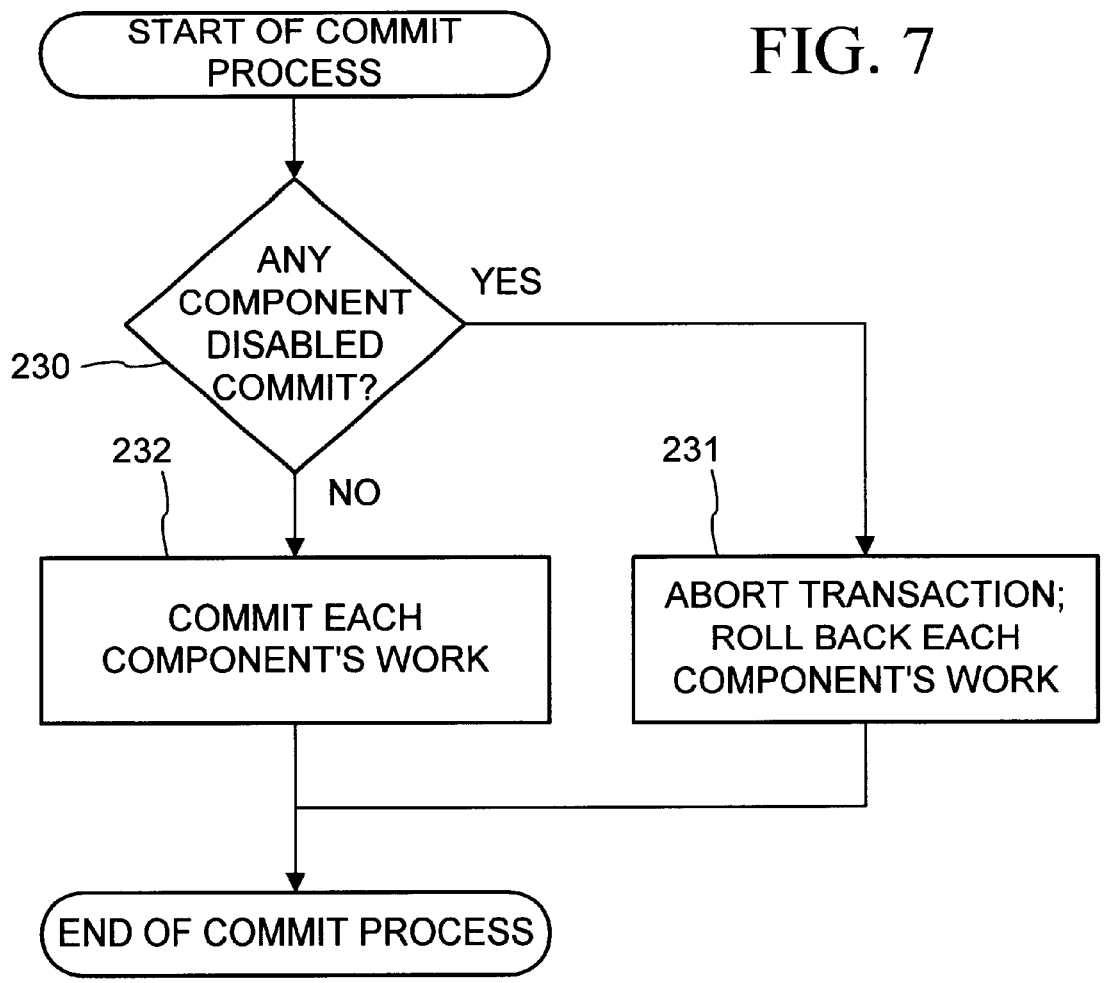

FIGS. 4–6 show an example of method steps performed in a client process (FIG. 4), server application component (FIG. 5), and transaction manager (FIG. 6) in the illustrated execution environment 82 (FIG. 2), which make use of the IObjectContext::EnableCommit and IObjectContext::DisableCommit functions to avoid premature committal of the server application component's work in accordance with the invention. In the illustrated example, the client program 134 (FIG. 2) creates the server application component 86 (FIG. 2) to perform a portion of the work in a transaction. The transaction manager 148 (FIG. 2) manages the outcome of the transaction.

With reference to FIG. 4, the client program 134 executes steps 200–202 during processing of a transaction. At step 200, the client program 134 creates the server application component 86 within the context of the transaction, such as by calling the ITransactionContext::CreateInstance function described above. This causes the server application component to be automatically associated with the transaction, such that any work done by the component (e.g., updates to the database 146 managed by the resource manager 140) is either committed or aborted by the transaction manager 148 with the transaction.

At step 201, the client program 134 invokes member functions of the server application component 86 to have the server application component perform a portion of the work in the transaction. Depending on the particular server application component and work to be performed, the client program 134 may call one or more of the server application component's member functions in step 201. In the foregoing order component example, for instance, the client program 134 may call an AddHeader function to set header information for the order, an AddItem function to add an individual order item to the order, and a SubmitOrder function when the order is complete. In response to the client's calls, the server application component 86 performs the requested work, and preferably also utilizes the EnableCommit and DisableCommit factious to avoid premature committal as shown in FIG. 5 and described below.

At a later step 202, the client program 134 commits the transaction, such as by calling the ITransactionContext::Commit function. This causes the transaction manager 148 to commit the work of the server application component (and of any other components in the transaction) unless any components in the transaction have disabled commit or aborted as shown in FIG. 6 and described below.

With reference to FIG. 5, the server application component 86 responds to calls from the client program 134 in step 201 of FIG. 4 by executing the steps 210–218. At step 210, the server application component 86 performs the portion of the work requested by the client program's call. In the above order component example, for instance, the order component at step 210 responds to an AddHeader call by generating an order header, or generates an order item in response to an AddItem call.

When returning from the call after performing the requested work, the server application component 86 may call one of the SetAbort, SetComplete, EnableCommit or DisableCommit functions on the IObjectContext interface of its component context object 136 (FIG. 2). As indicated at steps 211–212, the server application component 86 calls the SetAbort function in the event of a failure in the requested work. The conditions for failure depend on the business function implemented in the server application component 86. In the above money transfer example, for instance, the account component calls the SetAbort function if the requested money transfer would have resulted in a negative account balance. For another example, the account component also calls the SetAbort function if the account is closed. This causes the transaction manager 148 to abort the transaction, and roll back all work already performed in the transaction.

Otherwise, if the server application component 86 successfully completes its work in the transaction, the component calls the SetComplete function as indicated in steps 213–214. Again, the conditions on which the component successfully completes work depend upon the business function implemented in the component. In the above order component example, for instance, the order component calls the SetComplete function on return from the client's call to the order component's SubmitOrder function.

Still otherwise, if the server application component 86 returns from a client call without yet a failure or successful completion of work in the transaction, the server application component 86 calls either the EnableCommit or DisableCommit functions as indicated at steps 215–217. The server application component 86 calls the EnableCommit function if the component's work is in a valid state, where the work although not necessarily complete can be validly committed. Again, the conditions on which the component's work is valid depend upon the business function implemented in the component. In the order component example, for instance, the order component calls the EnableCommit function on return from the component's AddHeader or AddItem function if both a header and order item have been added. In that case, the order component's work is not necessarily complete because the client could again call the AddItem function to add additional order items. However, the component's work has already produced a valid order since the order contains both a header and at least one order item.

On the other hand, the server application component calls the DisableCommit function at step 217 if its work is not yet in a valid state, but has not failed. This prevents the client program 134 from committing the component's not yet valid work on return from the client's call. In the order component example, for instance, the order component calls the DisableCommit function on return from the component's AddHeader or Additem function if there is not yet both an order header and at least one order item. The order component's work has not failed since the client program in a future call could add the missing header or first order item.

Finally, at step 218, the server application component 86 returns from the client's call (step 201 of FIG. 4). The client program 134 can then make additional calls to the server application component at step 201, or commit the transaction at step 202 (FIG. 4).

With reference now to FIG. 6, the transaction manager 148 controls committal of the transaction when initiated by the client program's call to the ITransactionContext::Commit function. During processing of the client program's commit request, the transaction manager 148 checks at step 230 whether any component participating in the transaction currently disables commit (i.e., the component called the DisableCommit function at step 217 of FIG. 5 and did not subsequently call the EnableCommit function). If commit is disabled by any component in the transaction, the transaction manager 148 aborts the transaction and rolls back each component's work at step 231. Otherwise, if commit is enabled by all components in the transaction, the transaction manager 148 commits each component's work in the transaction at step 232.

Completion of Automatic Transactions

In the illustrated execution environment 82 (FIG. 2), the transaction server executive 80 completes processing of a transaction that was initiated automatically by the transaction server executive to meet the server application component's transactional expectations (herein referred to as an "automatic transaction") when the server application component for which the automatic transaction was initiated completes its work. More specifically, the illustrated execution environment 82 provides an object integration interface (the IObjectContext interface supported on the component context object 138) with which the server application component 86 indicates to the transaction server executive 80 that its work is complete. The server application component 86 calls a SetComplete member function of this interface to indicate its work was successfully completed, and calls a SetAbort member function to indicate its work was completed but must be aborted. When next returning from the server application component after the component has called either of these functions, the transaction server executive 80 causes the transaction manager 148 to complete the transaction. If the SetComplete function was called, the transaction server executive 80 causes the transaction to be committed (as long as no other component or resource involved in the transaction has indicated to abort the transaction). If the SetAbort function was called, the transaction server executive 80 causes the transaction to be aborted.

In the above discussed banking application for example, the transaction server executive 80 initiates an automatic transaction for the transaction component (whose transaction attribute is set to required because it performs two separate database updates using the credit and debit account components) if the transaction component's client program created the transaction component without initiating a transaction. The transaction component, in turn, creates the debit and credit account components to perform the withdrawal and deposit to the affected transferor and transferee accounts which form parts of the money transfer transaction. When created by the transaction server executive 80, the debit and credit account components (whose transaction attribute is set to supported because they perform only a single database update each) each automatically inherit the transaction from the transaction component.

After each component completes its part of the work (which may occur over the course of several interactions or calls from the client program 134 to transaction component, and transaction component to debit and credit account components), the components call either the SetComplete or SetAbort function of their component context objects. Upon the transaction component returning from a client program call during which the transaction component indicated completion of its work using the SetComplete or SetAbort functions, the transaction server executive 80 completes the transaction. If the transaction component called the SetComplete function and no other transaction participant indicated the transaction was to be aborted (such as the credit account component calling the SetAbort function), the transaction server executive 80 causes the transaction manager to commit the transaction. Otherwise, the transaction server executive 80 completes the transaction by causing the transaction manager to abort the transaction.

Overview of COM Object Instantiation in OLE

As with other COM objects, the client program 134 (FIG. 2) must first request creation of an instance of the server application component 86 (FIG. 2) and obtain a reference to the server application component before the client program can access the functionality implemented by the server application component (i.e., before the client program can call member functions supported on an interface of the server application component).

In Microsoft's OLE, a client program instantiates a COM object using services provided by OLE and a set of standard component interfaces defined by COM based on class and interface identifiers assigned to the component's class and interfaces. More specifically, the services are available to client programs as application programming interface (API) functions provided in the COM library, which is part of a component of the Microsoft Windows operating system in a file named "OLE32.DLL." Also in OLE, classes of COM objects are uniquely associated with class identifiers ("CLSIDs"), and registered by their CLSID in a system configuration database referred to as the "registry." The registry entry for a COM object class associates the CLSID of the class with information identifying an executable file that provides the class (e.g., a DLL file having a class factory to produce an instance of the class). Class identifiers are 128-bit globally unique identifiers ("GUID") that the programmer creates with an OLE service named "CoCreateGUID" (or any of several other APIs and utilities that are used to create universally unique identifiers) and assigns to the respective classes. The interfaces of a component additionally are associated with interface identifiers ("IIDs").

In particular, the COM library provides an API function, "CoCreateInstance," that the client program can call to request creation of a component using its assigned CLSID and an IID of a desired interface. In response, the CoCreateInstance API looks up the registry entry of the requested CLSID in the registry to identify the executable file for the class. The CoCreateInstance API function then loads the class' executable file, and uses the class factory in the executable file to create an instance of the COM object. Finally, the CoCreateInstance API function returns a pointer of the requested interface to the client program. The CoCreateInstance API function can load the executable file either in the client program's process, or into a server process which can be either local or remote (i.e., on the same computer or a remote computer in a distributed computer network) depending on the attributes registered for the COM object in the system registry.

Once the client program has obtained this first interface pointer of the COM object, the client can obtain pointers of other desired interfaces of the component using the interface identifier associated with the desired interface. COM defines several standard interfaces generally supported by COM objects including the IUnknown interface. This interface includes a member function named "QueryInterface." The QueryInterface function can be called with an interface identifier as an argument, and returns a pointer to the interface associated with that interface identifier. The IUnknown interface of each COM object also includes member functions, AddRef and Release, for maintaining a count of client programs holding a reference (such as, an interface pointer) to the COM object. By convention, the IUnknown interface's member functions are included as part of each interface on a COM object. Thus, any interface pointer that the client obtains to an interface of the COM object can be used to call the QueryInterface function.

Creating the Server Application Component

With reference still to FIG. 2, the client program 134 can create the server application component 86 in the illustrated execution environment 80 in any of several ways. First, the client program 134 can create the server application component 86 using the CoCreateInstance API function or an equivalent method based on the CoGetClassObject API function and IClassFactory::CreateInstance function (which are a conventional COM API function and standard COM interface). The CoGetClassObject API function on the server computer 84 returns a reference to a class factory provided in the transaction server executive 80 when the system registry entry for the requested class includes the transaction server execution attribute described above. This allows the transaction server executive to participate in a subsequent call to the IClassFactory::CreateInstance function (such as by the CoCreateInstance API function) since the call is then made to the class factory in the transaction server executive. In response to this call, the implementation of the IClassFactory::CreateInstance function in the transaction server executive's class factory creates the component context object 138 of the server application component 86. The transaction server executive 80 later calls the IClassFactory::CreateInstance function of the class factory 122 in the server application DLL file 120 to create the server application component 86. While this first approach may suffice for many client programs, there are some significant limitations for the client program, including the inability of the client program to control the server application component in a transaction.

While this first approach may suffice for many client programs, there are some significant limitations for the client program, including the inability of the client program to control the server application component in a transaction. Under the first approach, the transaction server executive 80 does not place the created server application component 86 in any transaction initiated or controlled by the client. Even though the client has not initiated a transaction for the server application component, the transaction server executive still may automatically provide a transaction to meet the server application component's transactional expectations. Specifically, if the transaction attribute of the server application component 86 is set to either of the not supported or supported values, the transaction server executive 80 does not place the server application component in a transaction (the transaction data property of the server application component's component context object 138 does not contain a transaction reference). Otherwise, if the server application component's transaction attribute is set to either the required or requires new values, the transaction server executive 80 automatically initiates and places the server application component in a transaction (such as by creating the transaction context object 150 for a new transaction, and including a reference to the new transaction context object 150 in the server application component's component context object 138).

Second, the server application component 86 can be created using the component context object of another component. The component context object provides an IObjectContext::CreateInstance member function which can be called to create other server application components that inherit context from the component context object (i.e., the component context objects created for the new components have the same context properties, including client id, activity id and transaction, as the original component context object). Except, in the special cases that the transaction attribute of the created server application component is "not supported" or "requires new," the transaction property is not inherited. For example, where a "transfer" component and two "account" components implement a money transfer operation in an on-line banking server application, the transfer component may create the two account components for the money transfer operation using its component object context. The account components automatically inherit properties from the transfer component's context and are included in the same transaction as the transfer component.

In this second approach, the server application component accesses its component context object using a service of the transaction server executive, called the GetObjectContext API function (described below).

Safe References

When the server application component 86 is created using any of the three above described approaches, the server application component executes in the illustrated execution environment 80 under control of the transaction server executive 80. More specifically, the client program's call to the CoCreateInstance or IObjectContext::CreateInstance functions to initiate creating the server application component returns a reference to the server application component referred to as a "safe reference." References obtained through a call to the server application component's QueryInterface member function (described above) also are safe references. Thus, through use of the QueryInterface function, the client program 134 can obtain multiple safe references to various interfaces supported on the server application component. Also, the client program 134 can pass safe references to other client programs and server application components to allow such other clients to also use the server application component 86.

Instead of being a direct pointer to the server application component's instance data structure 102 (FIG. 3) as are object references in COM, safe references refer indirectly to the server application component through the transaction server executive 80. Thus, calls made to the server application component's member functions using a safe reference always pass through the transaction server executive 80. This allows the transaction server executive to manage context switches, and allows the server application component to have a lifetime that is independent of the client program's reference to the component. The transaction server executive 80 tracks usage of all safe references to the server application component 86 through activation and deactivation, such that all safe references consistently refer to the current instance of the server application component when activated. When deactivated, a call using any safe reference to the server application component causes the transaction server executive to activate the server application component.

So as to ensure that all calls are made to the server application component using a safe reference (i.e., so that the calls pass through the transaction server executive 80), the server application component 86 preferably is programmed to not pass to a client or other object any direct reference to itself outside of a QueryInterface call. Instead, the server application component can obtain a safe reference to itself to provide to clients using a SafeRef API function (described below) of the transaction server executive 80.

Interfaces for Enabling and Disabling Transaction Committal

With reference again to FIG. 2, the IObjectContext interface 139 is an interface of the system provided component context object 138. The IObjectContext interface 139 is used by the server application component 86 to create additional server application components, and to participate in the determination of transaction outcomes. The illustrated IObjectContext interface 139 has the following form (in the C programming language):
DECLARE_INTERFACE_(IObjectContext, IUnknown)
{
  //IUnknown functions
  HRESULT QueryInterface(THIS_REFIID riid, LPVOID FAR* ppvObj);
  ULONG AddRef(THIS);
  ULONG Release(THIS);

//IObjectContext functions
  HRESULT CreateInstance(THIS_REFCLSID rclsid, REFIID riid, LPVOID FAR* ppvObj);
  HRESULT SetComplete(THIS);
  HRESULT SetAbort(THIS),
  HRESULT EnableCommit(THIS);
  HRESULT DisableCommit(THIS);
  BOOL IsInTransaction(THIS);
};

The EnableCommit function is called by the server application component 86 on return from a client call to indicate that the component allows its transactional updates to be committed in their present form. This is referred to as the enable commit state of the component, and is kept recorded in the component context object 136. The enable commit state is the initial default state of the server application, which remains in the enable commit state until the server application component indicates otherwise by calling DisableCommit, SetComplete, or SetAbort. The EnableCommit function returns a value to the caller as shown in the following table.

TABLE 1

EnableCommit return values.

| Value | Description |
| --- | --- |
| S_OK | Transaction enabled for commit. |
| E_FAIL | A server failure occurred. |
| E_UNEXPECTED | An unexpected error occurred. |

The DisableCommit function is called by the server application component 86 as shown in FIG. 5 to indicate that the component will not allow its transactional updates to be committed in their present form. Any attempt to commit the transaction before the server application component 86 indicates otherwise (using either EnableCommit or SetComplete) will cause the transaction to abort. The DisableCommit function returns a value as shown in the following table 2.

TABLE 2

DisableCommit return values.

| Value | Description |
| --- | --- |
| S_OK | Transaction disabled for commit. |
| E_FAIL | A server failure occurred. |
| E_UNEXPECTED | An unexpected error occurred. |
| E_NOCONTEXT | Not executing in a server application component under control of the transaction server executive 80. |

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. In a computer having computer-operating system code, a system code-supplied context object in a system code-created object execution environment wherein a client program interacts with an application component via a sequence of method invocations to cause the application component to perform processing work forming part of a transaction, the context object being associated with the application component and representing a context of execution of the application component within the object execution environment, the context object comprising:
   a work state datum for representing a work state of the application component as a commit disabled state or a commit enabled state;
   a programming interface exposed to the application component for issuing a call by the application component to the context object at a time preceding a return by the application component from a method invocation of the client program, the call signaling whether the processing work being performed by the application is valid to be committed; and
   function code responsive to the application component call to the programming interface and operative to set the work state datum according to validity of the processing work signaled by the application component call.

2. The context object of claim 1 wherein the function code is further operative to reversibly set the work state datum to the commit disable state upon a first call from the application component signaling processing work invalidity at a time preceding a first return from a first client program method invocation, and also operative to set the work state datum to the commit enabled state upon a second call from the application component signaling processing work validity at a later time preceding a second return from a second client program method invocation.

3. The context object of claim 1 further comprising a transaction reference to indicate the transaction.

4. The context object of claim 1 further comprising:
   a disable commit function member in the programming interface to which the application component issues the call to signal processing work invalidity; and
   an enable commit function member in the programming interface to which the application component issues the call to signal processing work validity.

5. The context object of claim 1 further comprising the function code being operative responsive to the application component's call issued to the disable commit function member at a time preceding a first return from a first client program method invocation to reversibly set the work state datum to the commit disable state, and also operative responsive to the application component's call issued to the enable commit function member at a later time preceding a second return from a second client program method invocation to set the work state datum to the commit enabled state.

6. The context object of claim 1 wherein the programming interface also is for issuing a further call by the application component to the context object at a time preceding a return by the application component from a method invocation of the client program, the further call signaling successful completion of the processing work, the context object further comprising function code responsive to this further call to cause the computer-operating system code to deactivate the application component.

7. The context object of claim 1 wherein the programming interface also is for issuing a further call by the application component to the context object at a time preceding a return by the application component from a method invocation of the client program, the further call signaling unsuccessful completion of the processing work, the context object further comprising function code responsive to this further call to cause abort of the transaction.

8. The context object of claim 7 wherein the function code operates responsive to the further call to also cause the computer-operating system code to deactivate the application component.

9. The context object of claim 1 further comprising:
   a disable commit function member in the programming interface to which the application component issues the call to signal processing work invalidity; and
   an enable commit function member in the programming interface to which the application component issues the call to signal processing work validity;
   a completion function member in the programming interface to which the application component may issue a further call at a time preceding a return by the application component from a method invocation of the client program to signal successfull completion of the processing work; and
   an abort function member in the programming interface to which the application component may issue a yet further call at a time preceding a return by the application component from a method invocation of the client program to signal unsuccessful completion of the processing work.

10. The context object of claim 1 further comprising function code responsive to the further call issued to the completion function member to cause the computer-operating system code to deactivate the application component.

11. The context object of claim 1 further comprising function code responsive to the yet further call issued to the abort function member to cause abort of the transaction.

12. The context object of claim 1 wherein the function code responsive to the yet further call issued to the abort function member also causes the computer-operating system code to deactivate the application component.

13. The context object of claim 1 wherein the computer further has transaction management code operative upon completion of the transaction to abort the transaction if the work state datum is in the commit disabled state.

14. In a computer, a computer-operating system for creating the context object of claim 1.

15. The computer-operating system of claim 14 wherein the function code of the context object is further operative to reversibly set the work state datum to the commit disable state upon a first call from the application component signaling processing work invalidity at a time preceding a first return from a first client program method invocation, and also operative to set the work state datum to the commit enabled state upon a second call from the application component signaling processing work validity at a later time preceding a second return from a second client program method invocation.

16. The computer-operating system of claim 14 wherein the programming interface of the context object also is for issuing a further call by the application component to the context object at a time preceding a return by the application component from a method invocation of the client program, the further call signaling successful completion of the processing work, the context object further comprising function code responsive to this further call to cause the computer-operating system code to deactivate the application component.

17. The computer-operating system of claim 14 wherein the programming interface of the context object also is for issuing a further call by the application component to the context object at a time preceding a return by the application component from a method invocation of the client program, the further call signaling unsuccessful completion of the processing work, the context object further comprising function code responsive to this further call to cause abort of the transaction.

18. The computer-operating system of claim 14 wherein the function code of the context object operates responsive to the further call to also cause the computer-operating system code to deactivate the application component.

19. The computer-operating system of claim 14 further comprising transaction management code operative upon completion of the transaction to abort the transaction if the work state datum is in the commit disabled state.

20. A computer-readable storage medium having computer-executable program code stored thereon for implementing the context object of claim 1.

21. The computer-readable storage medium of claim 20 wherein the function code of the context object is further operative to reversibly set the work state datum to the commit disable state upon a first call from the application component signaling processing work invalidity at a time preceding a first return from a first client program method invocation, and also operative to set the work state datum to the commit enabled state upon a second call from the application component signaling processing work validity at a later time preceding a second return from a second client program method invocation.

22. The computer-readable storage medium of claim 20 wherein the programming interface of the context object also is for issuing a further call by the application component to the context object at a time preceding a return by the application component from a method invocation of the client program, the further call signaling successful completion of the processing work, the context object further comprising function code responsive to this further call to cause the computer-operating system code to deactivate the application component.

23. The computer-readable storage medium of claim 20 wherein the programming interface of the context object also is for issuing a further call by the application component to the context object at a time preceding a return by the application component from a method invocation of the client program, the further call signaling unsuccessful completion of the processing work, the context object further comprising function code responsive to this further call to cause abort of the transaction.

24. The computer-readable storage medium of claim 20 wherein the function code of the context object operates responsive to the further call to also cause the computer-operating system code to deactivate the application component.

25. The computer-readable storage medium of claim 20 further comprising transaction management code operative upon completion of the transaction to abort the transaction if the work state datum is in the commit disabled state.

26. In a computer, a transaction management system operable in an object execution environment wherein a client program interacts with an application component via a sequence of method invocations to cause the application component to perform processing work forming part of a transaction, the transaction management system comprising:

a storage structure containing a datum to represent a work state of the application component's processing work in the non-committable work state;

a disable commit programming interface operating to set the datum to represent a non-committable work state in response to a call by the application component prior to return from a method invocation of the client program that leaves the application component's processing work in the non-committable work state;

an enable commit programming interface operating to set the datum to represent a committable work state in response to a call by the application component prior to return from a method invocation of the client program that leaves the application component's processing work in the committable work state; and transaction managing code operating responsive to the datum to prevent committal of the transaction while the datum is set to represent the non-committable work state, whereby the transaction management system avoids committal of the transaction between method invocations in which the application component's processing work is left in the non-committable work state.

27. The transaction management system of claim 26 further comprising a component context object encapsulating the storage structure and programming interfaces.

28. The transaction management system of claim 26 wherein the transaction managing code operates to abort the transaction in response to a request of the client program to commit the transaction while the datum represents the non-committable work state.

29. In a distributed objects computing environment having a transaction manager responsive to a disable commit signal to disallow committal of a transaction and responsive to an enable commit signal to again allow committal of the transaction, a method of operation of an application component with which a client program interacts via a sequence of method invocations to cause the application component to perform processing work forming part of a transaction, the method comprising:

performing at least some of the processing work in response to a method invocation of the client program;

at a time prior to return from the method invocation, determining whether the processing work is in a committable state;

issuing the disable commit signal if the processing work is not in the committable state;

issuing the enable commit signal if the processing work is in the committable state; and returning from the method invocation;

whereby the application component prevents committal of the transaction while the processing work is not in the committable state.

30. The method of application component operation of claim 29 further comprising:

issuing the disable commit signal at a time prior to return from a first method invocation of the client program when the processing work is not in the committable state; and issuing the enable commit signal at a later time prior to return from a second method invocation of the client program when the processing work is in the committable state.

31. The method of application component operation of claim 29 further comprising:

calling a disable commit programming interface of the distributed object computing environment to thereby issue the disable commit signal; and calling an enable commit programming interface of the distributed object computing environment to thereby issue the enable commit signal.

32. The method of application component operation of claim 29 wherein the distributed object computing environment provides a context object associated with the application component, the context object providing an interface with disable commit and enable commit method members, the method further comprising:

calling the disable commit method member on the context object's interface to thereby issue the disable commit signal; and calling the enable commit method member on the context object's interface to thereby issue the enable commit signal.

33. A computer-readable storage medium having computer-executable application program code stored thereon that operates when executed on a computer to provide the application component having the method of operation recited in claim 29.

34. In a distributed objects computing environment wherein a client program interacts with an application component via a sequence of method invocations to cause the application component to perform processing work forming part of a transaction, a method of operation of a transaction management system to prevent premature committal of the transaction before successful completion of the application component's processing work, the method comprising:

receiving a disable commit method call from the application component, the disable commit method call being indicative of the application component's processing work being in a non-committable state; and until an enable commit method call is received from the application component, disallowing committal of the transaction.

35. The method of transaction management system operation of claim 34 wherein the action of disallowing committal of the transaction comprises:

upon receiving a request to commit the transaction at a time after receiving the disable commit method call and the enable commit method call has not been received, aborting the transaction.

36. The method of transaction management system operation of claim 34 further comprising:

receiving the enable commit method call from the application component, the enable commit method call being indicative of the application component's processing work being in a committable state; and after receipt of the enable commit method call, again allowing committal of the transaction.

37. The method of transaction management system operation of claim 36 further comprising:

receiving a request to commit the transaction;

aborting the transaction if the request to commit the transaction is received after the disable commit method call and before the enable commit method call; and committing the transaction if the request to commit the transaction is received after the enable commit method call and all other participants in the transaction have successfully completed their processing in the transaction.

38. A computer-readable storage medium having computer-executable application program code stored thereon that operates when executed on a computer to implement the transaction management system having the method of operation recited in claim 34.

39. In a distributed objects computing environment wherein a client program interacts with a plurality of application components via a sequence of method invocations to cause the application components to perform portions of processing work in the transaction, a method of operation of a transaction management system to prevent committal of the transaction while the processing work of any of the application components is left incomplete between the client program's method invocations on such application component, the method comprising:

maintaining data to track whether committal is disabled or enabled individually per application component participating in the transaction;

receiving method calls from the application components prior to their return from the client program's method invocations, the method calls signaling to disable or enable committal for the respective application component;

receiving a request to commit the transaction; and causing the transaction to abort if committal is disabled for any of the application components participating in the transaction.

40. The method of transaction management system operation of claim 36 further comprising:

upon receipt of a first method call signaling to disable committal for a first application component, setting the data to represent that committal is disabled for the first application component; and upon receipt of a later method call signaling to enable committal for the first application component, setting the data to represent that committal is again enabled for the first application component.

41. A computer-readable storage medium having computer-executable application program code stored thereon that operates when executed on a computer to implement the transaction management system having the method of operation recited in claim 39.

* * * * *

UNITED STATES PATENT AND TRADEMARK OFFICE
CERTIFICATE OF CORRECTION

PATENT NO. : 6,301,601 B1
DATED : October 9, 2001
INVENTOR(S) : Helland et al.

It is certified that error appears in the above-identified patent and that said Letters Patent is hereby corrected as shown below:

<u>Drawings,</u>
Fig. 2, block labeled "context", the reference number "136" should read -- 138 --.

<u>Column 2,</u>
Line 5, "begin $_{13}$ transaction" should read -- begin_transaction --.

<u>Column 7,</u>
Line 48, "server application a components" should read -- server application components --.

<u>Column 9,</u>
Line 10, "sever" should read -- server --.

<u>Column 10,</u>
Line 21, "HKEY$_{13}$CLASSES$_{13}$ROOT/CLSID" should read -- HKEY_CLASSES_ROOT/CLSID --.

<u>Column 11,</u>
Line 54, "80" should be -- 82 --.
Line 61, "136" should read -- 138 --.

<u>Column 12,</u>
Lines 38 and 42, "80" should be -- 82 -- .

<u>Column 14,</u>
Lines 16-17, "server application component 134" should read -- server application component 86 --.
Lines 30-31, "component contest object 134" should read -- component context object 138 --.

<u>Column 16,</u>
Lines 16, 36, 45, 60 and 64, "136" should read -- 138 --.
Lines 53 and 57, "Additem" should read -- AddItem --.

UNITED STATES PATENT AND TRADEMARK OFFICE
CERTIFICATE OF CORRECTION

PATENT NO. : 6,301,601 B1
DATED : October 9, 2001
INVENTOR(S) : Helland et al.

It is certified that error appears in the above-identified patent and that said Letters Patent is hereby corrected as shown below:

Column 17,
Line 1, "136" should read -- 138 --.
Line 44, "factious" should read -- functions --.
Line 66, "136" should read -- 138 --.

Column 21,
Line 36, "executive still" should read -- executive 80 still --.

Column 23,
Line 28, "object 136" should read -- object 138 --.

Column 25,
Line 40, "successfull" should read -- successful --.

Signed and Sealed this

Fifteenth Day of October, 2002

Attest:

Attesting Officer

JAMES E. ROGAN
Director of the United States Patent and Trademark Office